(12) United States Patent
Frederickson

(10) Patent No.: US 11,371,255 B2
(45) Date of Patent: Jun. 28, 2022

(54) TRUCK BED CAMPER

(71) Applicant: Donavon Cecil Frederickson, Manhattan, MT (US)

(72) Inventor: Donavon Cecil Frederickson, Manhattan, MT (US)

(*) Notice: Subject to any disclaimer, the term of this patent is extended or adjusted under 35 U.S.C. 154(b) by 288 days.

(21) Appl. No.: 16/826,255

(22) Filed: Mar. 22, 2020

(65) Prior Publication Data
US 2021/0293047 A1    Sep. 23, 2021

(51) Int. Cl.
*E04H 15/06* (2006.01)
*B60J 7/16* (2006.01)
*B60P 3/34* (2006.01)

(52) U.S. Cl.
CPC ............ *E04H 15/06* (2013.01); *B60J 7/1621* (2013.01); *B60P 3/341* (2013.01)

(58) Field of Classification Search
CPC ..... B60P 3/34; B60P 3/341; B60P 3/39; B60J 7/1607; B60J 7/1621; E04H 15/06
USPC ......................................... 296/165, 169, 173
See application file for complete search history.

(56) References Cited

U.S. PATENT DOCUMENTS

| | | | |
|---|---|---|---|
| 4,027,912 A * | 6/1977 | Pacca ...................... | B60P 3/38 |
| | | | 296/160 |
| 4,088,363 A * | 5/1978 | Palmer .................... | B60P 3/341 |
| | | | 135/88.13 |
| 4,109,954 A | 8/1978 | Wall | |
| 4,176,873 A | 12/1979 | Barr et al. | |
| 4,294,484 A | 10/1981 | Robertson | |
| 4,364,133 A * | 12/1982 | Gunter ..................... | B60P 3/30 |
| | | | 296/156 |
| 5,213,390 A * | 5/1993 | Borchers ................. | B60P 3/341 |
| | | | 296/100.06 |
| 5,544,671 A * | 8/1996 | Phillips ................... | B60P 3/341 |
| | | | 135/88.14 |
| 5,788,319 A | 8/1998 | Pruitt | |
| 6,394,531 B2 * | 5/2002 | Thompson .............. | B60P 3/341 |
| | | | 296/26.02 |
| 6,698,634 B2 | 3/2004 | Thomson | |
| 6,712,422 B1 | 3/2004 | Vaillancourt | |
| 6,749,252 B2 | 6/2004 | Cervenka | |
| 6,811,207 B2 * | 11/2004 | Dalpizzol ................ | B60J 5/101 |
| | | | 135/88.01 |
| 7,017,975 B2 * | 3/2006 | Parmer .................... | B60P 3/06 |
| | | | 296/26.02 |
| 7,281,744 B1 * | 10/2007 | Schultz ................... | B60J 7/1621 |
| | | | 296/100.1 |
| D574,315 S | 8/2008 | Swails et al. | |

(Continued)

*Primary Examiner* — Jason S Morrow
(74) *Attorney, Agent, or Firm* — Antoinette M. Tease

(57) ABSTRACT

A truck bed camper having an upper unit that does not extend over the cab of the pickup truck when the camper open or closed, a rigid aluminum lid that is attached to side panels of the upper unit and rotatably attached to a rear side panel of the upper unit and that forms a bed platform when open, a pneumatic gas spring with one end rotatably attached to a side panel and one end attached to the lid, a solar panel that is rotatably mounted to the upper surface of the lid, a foldable tent supported by a collapsible frame and positioned over the side panels and the lid when the lid is in an open position, a tent erector tool that is removably and rotatably inserted into a strut upper receiver mounted on the lid, and a lower unit that is configured to contain freshwater and blackwater tanks.

20 Claims, 9 Drawing Sheets

(56) References Cited

U.S. PATENT DOCUMENTS

| | | |
|---|---|---|
| 7,481,480 B2 | 1/2009 | Thacker |
| 7,527,318 B2 | 5/2009 | Geise |
| 7,942,464 B2 | 5/2011 | Schmidt |
| 10,086,684 B1 | 10/2018 | Stamm, Jr. |
| 10,125,517 B2* | 11/2018 | Xu .......................... B60P 3/34 |
| 10,596,951 B1* | 3/2020 | Williams ................ B60P 3/343 |
| 10,829,028 B2* | 11/2020 | Delgadillo, Jr. ....... B60J 7/1657 |
| 11,059,414 B2* | 7/2021 | Dorn ...................... E04H 15/06 |
| 11,130,437 B1* | 9/2021 | Tatro ........................ B60P 3/39 |
| 11,230,218 B2* | 1/2022 | Chevalier ................ B60P 3/36 |
| 2003/0197043 A1 | 10/2003 | Thomson |
| 2004/0262948 A1* | 12/2004 | Parmer .................. B60P 3/341 |
| | | 296/157 |
| 2006/0066071 A1* | 3/2006 | Fisher .................... B60P 3/341 |
| | | 280/165 |
| 2006/0244283 A1 | 11/2006 | Thacker |
| 2007/0296240 A1 | 12/2007 | Geise |
| 2009/0079229 A1 | 3/2009 | Schmidt |
| 2009/0200820 A1 | 8/2009 | Smith, Jr. |
| 2019/0202333 A1* | 7/2019 | Delgadillo, Jr. ........ B60P 3/341 |
| 2022/0017008 A1* | 1/2022 | Davis ........................ B60P 3/38 |
| 2022/0097593 A1* | 3/2022 | Backer .................... B60P 3/34 |

* cited by examiner

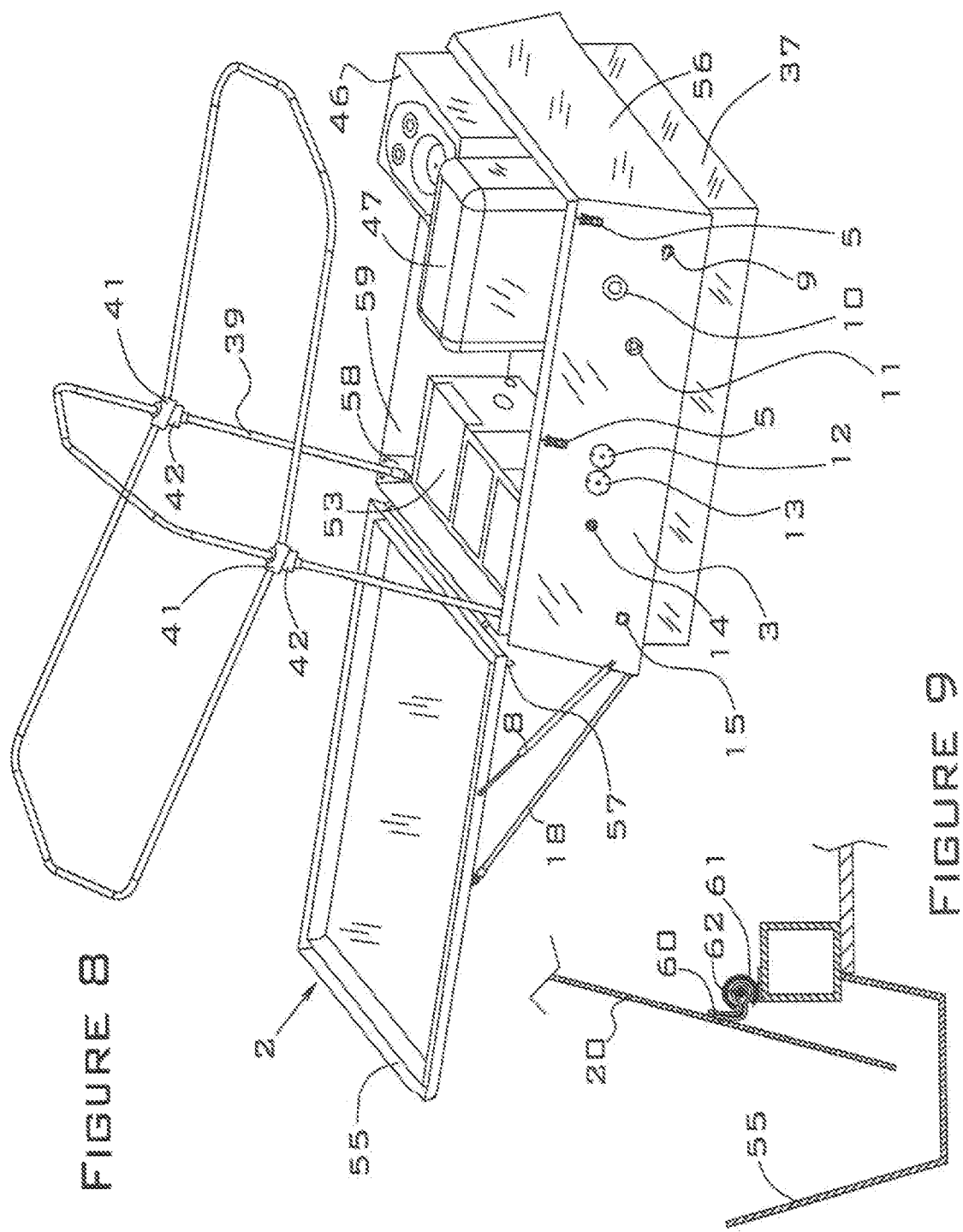

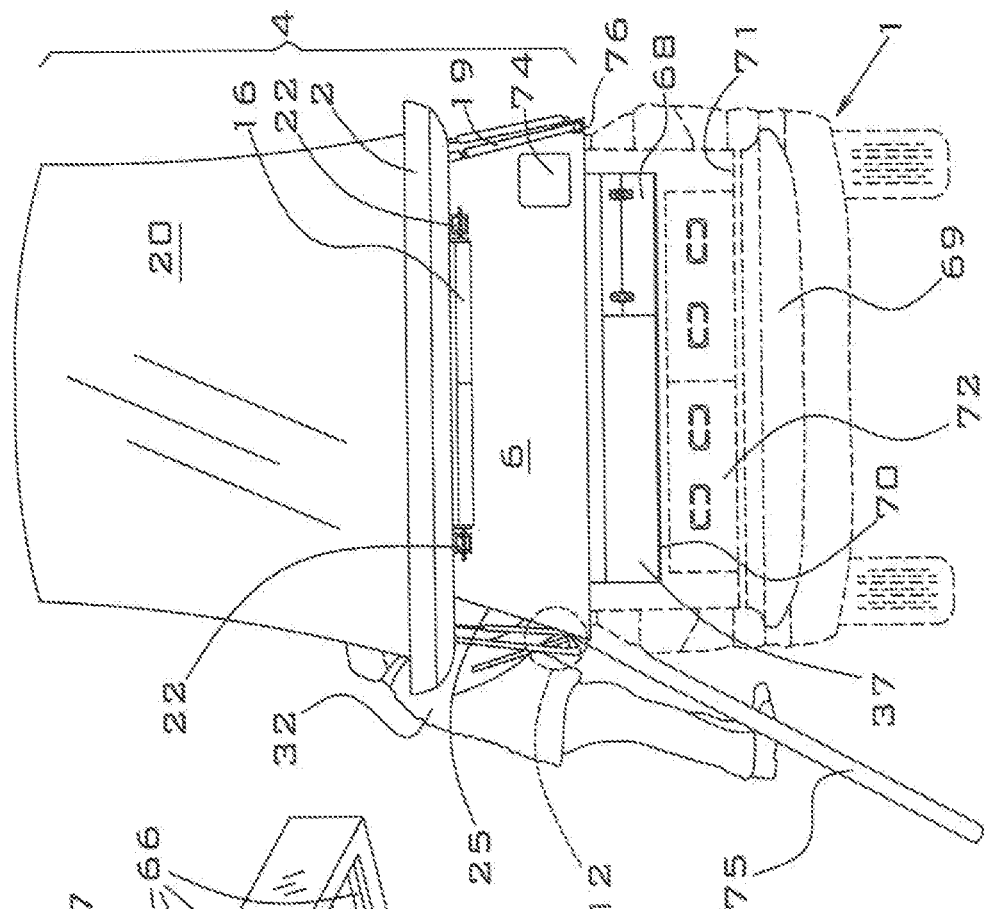

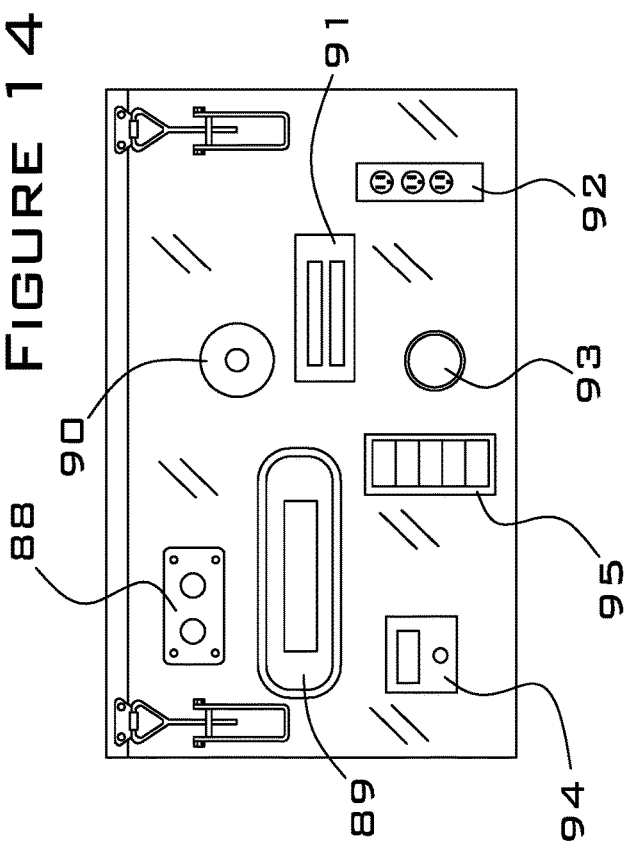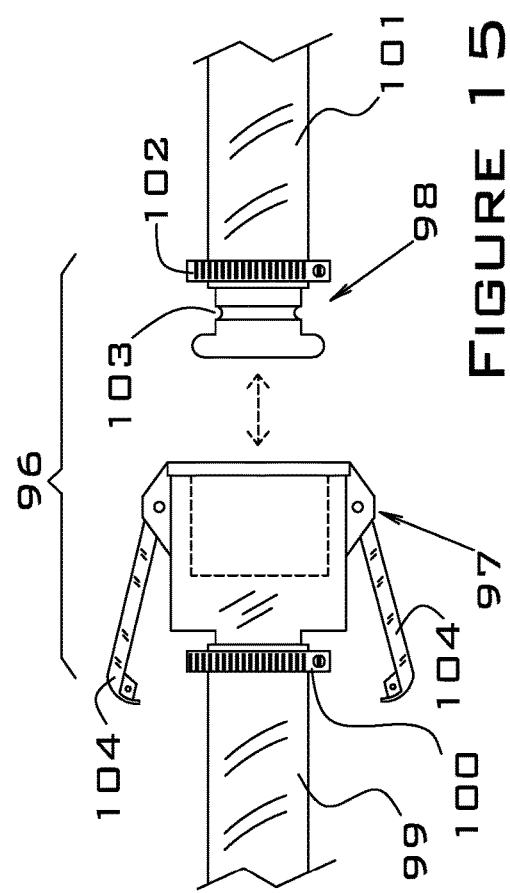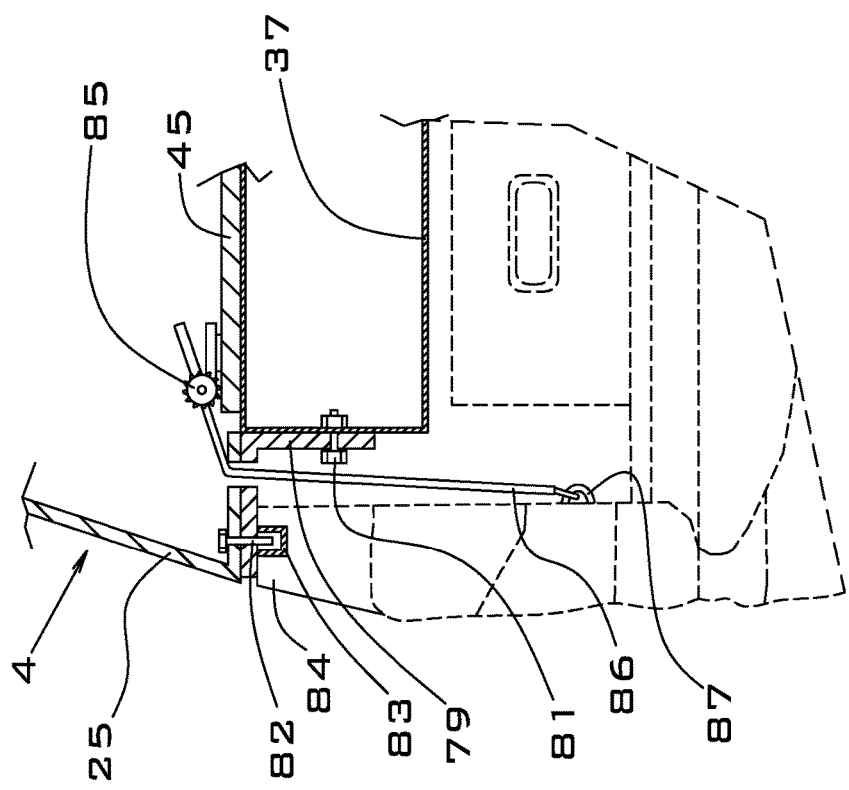

TRUCK BED CAMPER

BACKGROUND OF THE INVENTION

1. Field of the Invention

The present invention relates generally to the field of recreational camping units, and more particularly, to a truck-mounted camping unit equipped with heat, light, and running water.

2. Description of the Related Art

The present invention is a fully functional, self-contained truck-mounted camper that incorporates electrical lighting, hot and cold-water faucets, a refrigerator, a furnace with multiple outlets, a flush toilet, a shower, dual water storage tanks, a stovetop cooking unit, and associated wiring and plumbing. The camper and the pickup truck in which the camper is installed form a fully equipped recreational vehicle. The present invention incorporates numerous novel advantageous features including:
  1) In the closed position (i.e., ready for traveling), the top of the compacted unit does not extend higher than the roof of the truck cab.
  2) In the open position (i.e., set up for camping), the floor of the living area is level with the top of the truck bed sidewalls, and there is adequate space in the truck bed under the bottom of the camper unit for a ten-inch tall, lockable storage unit such as a TruckVault® storage unit.
  3) Electrical systems are powered by a rechargeable lithium battery, which may be charged with an integral solar panel. The solar panel is movably mounted so that it can be set to face the sun when the unit is in either the closed or open position.
  4) The perimeter of the tented area is equipped with a rainwater catchment system, and a holding tank is provided for storage of the recovered rainwater.

Although there are numerous examples of truck-mounted tents and camping units in the prior art and on the commercial market, none of these devices provides the combination of novel and useful features of the present invention.

U.S. Pat. No. 4,109,954 (Wall, 1978) discloses an expandable camper apparatus for use in conjunction with a pickup truck. This invention comprises a tent-like shelter with a foldable floor that is positioned rearward of the truck bed when the tent is opened. The foldable floor is stored in a compartment on the bottom of the truck bed when the invention is in the closed position, thereby precluding the installation of a TruckVault® storage unit or similar container. The invention does not comprise any appliance such as a furnace, refrigerator, or water heater.

U.S. Pat. No. 4,176,873 (Barr et al., 1979) discloses a vehicle camper shell that comprises a tent assembly that is positioned over the roof of the vehicle cab when the tent is in the open position. In the closed position, the top of the invention extends above the top of the roof of the truck cab. The invention does not comprise any appliances.

U.S. Pat. No. 4,294,484 (Robertson, 1981) discloses a truck-mounted camper unit that comprises a tent that unfolds outward from the vehicle's sidewalls. The floor of the truck bed serves as the camper's floor when the tent is opened. The invention does not comprise any appliances.

U.S. Pat. No. 5,788,319 (Pruitt, 1998) discloses a collapsible truck-mounted camper shell that fits into the bed of a pickup truck when folded and extends over the cab of the truck and outward beyond the sidewalls of the vehicle in the open position.

U.S. Pat. No. 6,698,634 (Thompson, 2004) discloses a truck-mounted camping unit that fits into the bed of a pickup truck or trailer and that is opened by extending the unit rearward on rails. The invention may comprise a sound system and a cold-water shower that are powered by a battery. The invention may be mounted onto a truck with or without a tailgate. The invention fills the entire volume of the truck bed when in the closed position.

U.S. Pat. No. 6,712,422 (Vaillancourt, 2004) discloses a combination truck-box cover and collapsible tent-like shelter. When open, the tent portion of the unit extends rearward beyond the rear bumper of the truck and outward beyond the sidewalls of the truck. The floor of the truck bed serves as the shelter floor. The invention does not comprise any appliances.

U.S. Pat. No. 6,749,252 (Cervenka, 2004) discloses a truck-bed mounted, fold-out camper unit that comprises a tent shelter and frame components that, when retracted, fit into the bed of the truck without obstructing the cargo area of the bed. When the camper is in the open position, the tent shelter extends laterally beyond the sidewalls of the truck. The top of the unit can be partially raised to form and extended volume of the truck bed for transporting materials. The invention does not comprise any appliances.

U.S. Pat. No. 7,481,480 (Thacker, 2009) discloses a truck bed cover comprising swivelly mounted legs that are used to extend the cover portion of the device upward and outward over the rear tailgate of the bed. The invention utilizes gas springs or other springs to counter-balance the weight of the top, thereby requiring less force to raise and lower the top. The invention comprises an electrical light that is powered by the truck battery but contains no other appliances or camping accoutrements such as beds.

U.S. Pat. No. 7,527,318 (Geise, 2009) discloses a shelter attachment for a pickup truck that fits into the truck bed when collapsed and that is rotatably attached to one side of the truck bed. The lid of the device rotates outward beyond the sidewall of the bed to form a bed. Wire ropes are used to raise and support a mast, and the wire ropes and mast support a sheeting material that forms the walls of the shelter. When the shelter is in the open position, the floor of the truck bed serves as the shelter floor. The invention does not comprise any appliances.

U.S. Pat. No. 7,942,464 (Schmidt, 2011) discloses a pop-up camper that fits inside the bed of a pickup truck when collapsed and is protected by a cover that fits over the bed of the truck. When the unit is in the open position, the sleeping area is located on top of the truck bed, and a tent shelter erected rearward of the vehicle at ground level serves as a living area. The invention comprises a battery, a propane tank, a freshwater tank, a gray water tank, and an optional furnace, but no mention is made of a sink, water heater, stove, flush toilet or refrigerator. The living area comprises side spaces for a cold shower and a portable (i.e., non-flushable) toilet.

U.S. Pat. No. 10,086,684 (Stamm, Jr., 2018) discloses a collapsible pickup truck cap and storage system that comprises a cap that can be raised at the rear end with a cap lift assembly, and the front end of the cap is attached with hinges to the roof of the truck cab. Rear doors replace the truck tailgate, and these doors may be lowered to form an outdoor dining table or cooking area for camping. The invention does not comprise any appliances.

U.S. Patent Application Pub. No. 2009/0200820 (Smith, Jr., 2009) discloses a truck tent camper unit comprising a collapsible frame that forms a lumber-carrying rack within the truck bed when in the collapsed position and that forms the framework of a tent when in the expanded position. The tent extends outward beyond the sidewalls of the truck and over a portion of the roof of the truck cab. When the unit is in an open position, the floor of the truck bed serves as the floor of the tented area. The invention does not comprise any appliances.

U.S. Patent Application No. D574,315 (Swails, et al., 2008) is a design patent for an "expedition vehicle" that comprises a collapsible tent having a dome-like shape when in the expanded position. In the closed position, the height of the tent portion of the invention extends above the height of the roof of the truck cab.

BRIEF SUMMARY OF THE INVENTION

The present invention is a truck bed camper configured to be mounted on top of a pickup truck with a truck bed having side rails, the truck bed camper comprising: an upper unit, wherein no part of the upper unit extends over a cab of the pickup truck when the camper is in an open or a closed position; a rigid aluminum lid that is attached to a right side panel and a left side panel of the upper unit with one or more latches and rotatably attached to a rear side panel of the upper unit with at least one hinge, the lid forming a bed platform when in an open position; a pneumatic gas spring with a first end and a second end, the first end being rotatably attached to one of the right side panel or the left side panel of the upper unit, and the second end being rotatably mounted to the lid; a solar panel that is rotatably mounted to an upper surface of the lid; a foldable tent supported by a collapsible frame, the foldable tent being positioned over the right side panel, the left side panel, and the lid when the lid is in an open position; a tent erector tool having an upper end that is removably and rotatably inserted into a strut upper receiver mounted on a side of the lid; wherein the side rails of the truck bed have a height, a floor that is positioned at a height above the height of the side rails of the pickup truck; and a lower unit that is configured to contain one or more freshwater tanks and a blackwater tank.

In a preferred embodiment, at least one of the right side panel or the left side panel comprises a hinged human access door. In another preferred embodiment, the invention further comprising a jack attachment fitting on a lower rear edge of one or the right side panel or the left side panel of the upper unit. In yet another preferred embodiment, the invention further comprises a sink drain outlet, a furnace exhaust vent, a 115-volt alternating current inlet plug, a first freshwater tank inlet connector, a second freshwater tank inlet connector, and a blackwater tank vent on one of the right side panel or the left side panel of the upper unit.

In a preferred embodiment, the strut upper receiver is mounted to one of a right edge or a left edge of the lid and a strut with a ball-shaped upper end that is removably and rotatably attached to the strut upper receiver and a lower end that is attached to a strut lower receiver on the rear side panel of the upper unit. In another preferred embodiment, the invention further comprises a first extendable solar panel support member that is removably attached to a first side of the solar panel and a second extendable solar panel support member that is removably attached to a second side of the solar panel and configured to support the solar panel when it is in an extended position. In yet another preferred embodiment, the human access door is removably attached to the at least one of the right side panel or the left side panel.

In a preferred embodiment, at least one of the right side panel or the left side panel comprises a hinged propane tank access door that is configured to cover a propane tank storage compartment. In another preferred embodiment, the tent erector tool comprises an upper section that is rotatably connected to a lower section via a hinge, the upper section of the tent erector tool being a strut, and the lower section of the tent erector tool being an extension handle. In yet another preferred embodiment, the collapsible frame of the foldable tent is comprised of a U-shaped front frame section with two ends, a U-shaped center frame section with two sides and two bottom ends, and a U-shaped rear frame section with two ends; wherein the two bottom ends of the center frame section are connected to left and right rear corners of an interior floorspace with rotatable bottom connectors; wherein two frame side connectors connect the ends of the front frame section and the rear frame section to the two sides of the center frame section; and wherein the two frame side connectors are configured to allow the front and rear side frame sections to rotate independently about the center frame section and to slide up and down along the center frame section.

In a preferred embodiment, the frame side connectors each incorporates a slide stop that is configured to enable the front and rear frame sections to be locked into position on the center frame section. In another preferred embodiment, the invention further comprises a rear cable-and-pully assembly having one end attached to a top middle of the center frame section and a second end attached to a rear end of the lid; and a pair of forward cable-and-pully assemblies, each forward cable-and-pully assembly having a first end attached to a side frame connector and a second end attached to a front inside corner of the interior floorspace. In yet another preferred embodiment, the upper unit is configured to contain: a removably mounted kitchen unit comprising a sink, faucet and stovetop; a removably mounted portable refrigerator; a toilet cabinet containing a toilet; a propane-powered combination furnace/hot water heater; and one or more storage cabinets, each storage cabinet having a hinged seat top.

In a preferred embodiment, the lid comprises a perimeter, and the perimeter of the lid comprises a rainwater catchment trough that is configured to permit rainwater to flow into a freshwater holding tank via a rainwater drain connector. In another preferred embodiment, a bottom edge of the collapsible tent extends into and is mechanically constrained within the rain catchment trough. In yet another preferred embodiment, the lower unit is a self-contained modular unit that is removably attached to an underside of the upper unit.

In a preferred embodiment, the lower unit comprises a bottom plate that terminates at least one foot above a bottom of the truck bed. In another preferred embodiment, the rear side panel comprises a shower port. In yet another preferred embodiment, the invention further comprises a ratchet strap that is mounted to the floor of the upper unit and configured to tighten the upper unit against side walls of the truck bed. Appliances contained within the upper unit are preferably configured to obtain power from the truck battery and from a lithium battery situated within the upper unit, and the lithium battery is preferably configured to be charged by the solar panel.

BRIEF DESCRIPTION OF THE DRAWINGS

FIG. 8 is a second perspective view of the present invention shown in the expanded position, showing the right side panel, the front panel and a portion of the interior, with the tent, the cable-and-pully assemblies, solar panel and the mattress pad removed for clarity.

FIG. 9 is a detail view of a portion of the water-catchment system.

FIG. 10 is a perspective view of the lower unit showing the underside, with the bottom plate and hoses removed for clarity.

FIG. 11 is a rear view of the present invention mounted onto a pickup truck, shown with the truck tailgate in an open position.

FIG. 12 is a detail perspective view of a portion of the left strut, the extension handle, and a left strut lower receiver.

FIG. 13 is a cross-section detail view of the components that attach the present invention to a pickup truck.

FIG. 14 is an elevation view of the control panel 48.

FIG. 15 is an elevation view of a typical quick-disconnect fitting of the type utilized in the present invention, with the quick-disconnect fitting shown in the disconnected position.

REFERENCE NUMBERS

Figure 1:
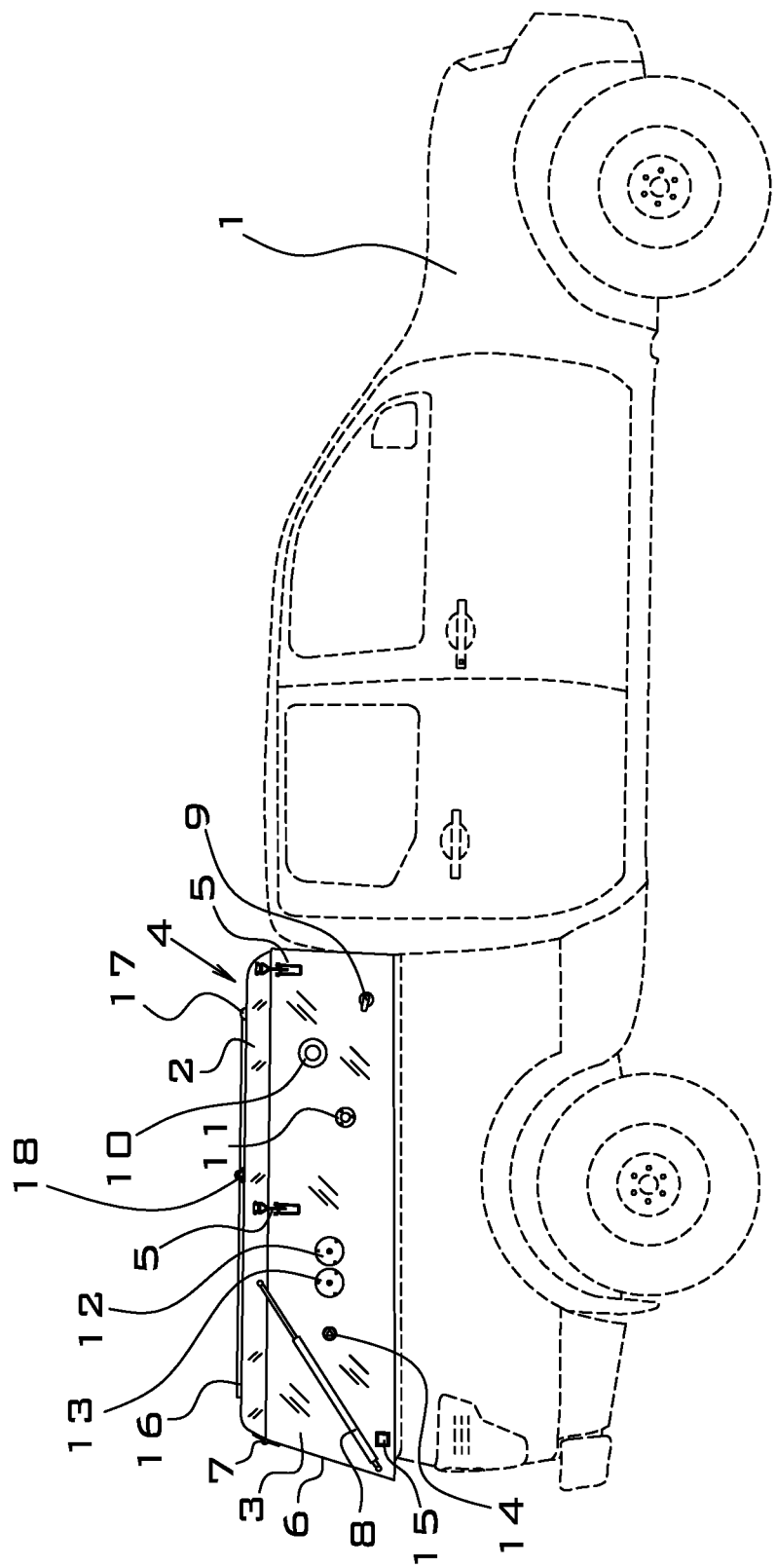
FIG. 1 is an elevation view of the right side of the present invention, shown in the compacted position, and mounted onto a standard-size pickup truck.

1 Pickup truck
2 Lid
3 Right side panel
4 Upper unit
5 Cam latch
6 Rear side panel
7 Lid hinge
8 Pneumatic gas spring
9 Sink drain outlet
10 Furnace exhaust vent
11 115 VAC voltage inlet plug
12 First tank water inlet connector
13 Second tank water inlet connector
14 Blackwater tank vent
15 Jack attachment fitting
16 Solar panel
17 Solar panel hinge
18 Right strut upper receiver
19 Right strut
20 Tent
21 Tent window
22 Solar panel support member
23 Zippered door flap
24 Access port
25 Left side panel
26 Human access door
27 Human access door hinge
28 Key locks
29 Handhold
30 Propane tank access door
31 Left strut
32 Person
33 Tent erector tool
34 Left strut upper receiver
35 Hinge of tent erector tool
36 Extension handle
37 Lower unit
38 Front frame section
39 Center frame section
40 Rear Frame section
41 Frame side connector
42 Slide lock
43 Rear cable-and-pully assembly
44 Forward cable-and-pully
45 Floor
46 Kitchen unit
47 Refrigerator
48 Equipment cabinet
49 Control panel
50 First storage cabinet
51 Table
52 Second storage cabinet
53 Toilet cabinet
54 Mattress pad
55 Rain catchment trough
56 Front panel
57 Rainwater drain connector
58 Rotatable bottom connector
59 Left interior wall
60 Tab on tent fabric
61 Circular channel
62 Rigid rod
63 First freshwater tank
64 Second freshwater tank
65 Blackwater tank
66 Aluminum angle
67 Macerator pump
68 Rear door of the bottom unit
69 Tailgate of truck
70 Bottom plate of the lower unit
71 Bottom of truck bed
72 Gun safe
73 Turnbuckle
74 Shower port
75 Ladder
76 Right strut lower receiver
77 Left strut lower receiver
78 Left strut lower connector
79 Pin
80 Aluminum angle
81 Riveted nut and bolt assembly
82 Bolt for stake pocket
83 Stake pocket
84 Truck bed sidewall
85 Handle of rachet strap
86 Strap of rachet strap
87 D-ring
88 Phone charger
89 Charge manager for lithium battery
90 Light 91 Voltage inverter
92 115 VAC electrical outlet
93 Furnace hot air outlet
94 Thermostat
95 Switch bank
96 Quick-disconnect fitting
97 Male portion of the quick-disconnect fitting
98 Female portion of the quick-disconnect fitting
99 First hose
100 First hose clamp
101 Second hose
102 Second hose clamp
103 Annular groove
104 Cam arm
105 Seat top of toilet cabinet
106 Toilet lid
107 Toilet seat
108 Toilet bowl

DETAILED DESCRIPTION OF INVENTION

The present invention, together with a standard domestic pickup truck into which the present invention is installed, form a fully functional recreational vehicle. When the present invention is placed in the compacted (that is, closed) position, the height does not extend more than six inches above the roof of the truck cab, the width does not extend beyond the sidewalls of the truck, the rear portion does not extend beyond the rear bumper of the truck, and the front portion does not extend over the cab of the truck. This very compact configuration minimizes wind drag and wind noise when traveling and provides excellent aesthetics. When the present invention is in the expanded (that is, open) position, a tented shelter extends in the forward direction over the truck bed, and the rearward portion extends over and beyond the truck tailgate. The sides of the tented shelter extend laterally to the width of the truck bed sidewalls. The present invention is comprised of an upper unit, which includes the components installed above the truck bed, and a lower unit, which includes the components installed within the truck bed. The upper and lower units are modular and separable.

Figure 3:
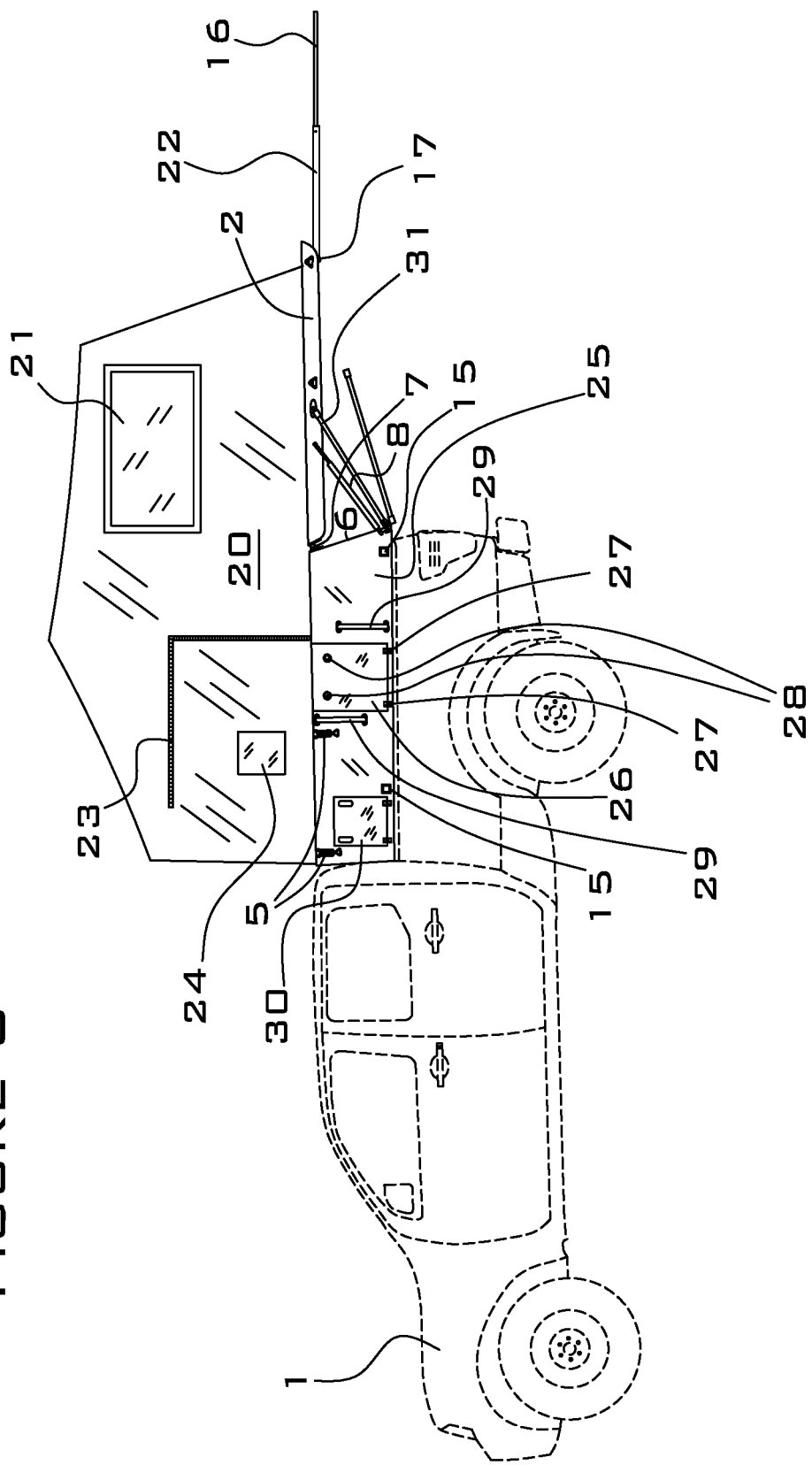
FIG. 3 is an elevation view of the left side of the present invention, shown in the expanded position, and mounted onto a standard-size pickup truck.

FIG. 1 is an elevation view of the right side of the present invention, shown in the compacted position, and mounted onto a standard-size pickup truck 1 having a bed length of 6-½ feet. The present invention comprises a rigid aluminum lid 2, which, with the present invention in the compacted position, is attached to the right side panel 3 of the upper unit 4 by two cam latches 5 and is also attached to the left side panel by to two additional cam latches, as shown in FIG. 3. The lid 2 is rotatably attached to the rear side panel 6 of the upper unit 4 by a lid hinge 7 that is attached to the top edge of the rear side panel 6 and by an additional lid hinge that is attached to the left side panel of the upper unit, as shown in FIG. 3. A pneumatic gas spring 8 has one end rotatably mounted to the lower rear corner of the right side panel 3 and the other end rotatably mounted to the right edge of the lid 2. A sink drain outlet 9, a furnace exhaust vent 10, a 115 volt alternating current (VAC) inlet plug 11, a first freshwater tank inlet connector 12, a second freshwater tank inlet connector 13, and a blackwater tank vent 14 are mounted on the right side panel 3 at the locations shown. A jack attachment fitting 15 is positioned near the lower rear edge of the right side panel 3. An upward-facing solar panel 16 is rotatably mounted to the upper surface of the lid 2 with solar panel hinges 17 (see also FIG. 3). A right strut upper receiver 18 is mounted to the right edge of the lid 2.

Figure 2:
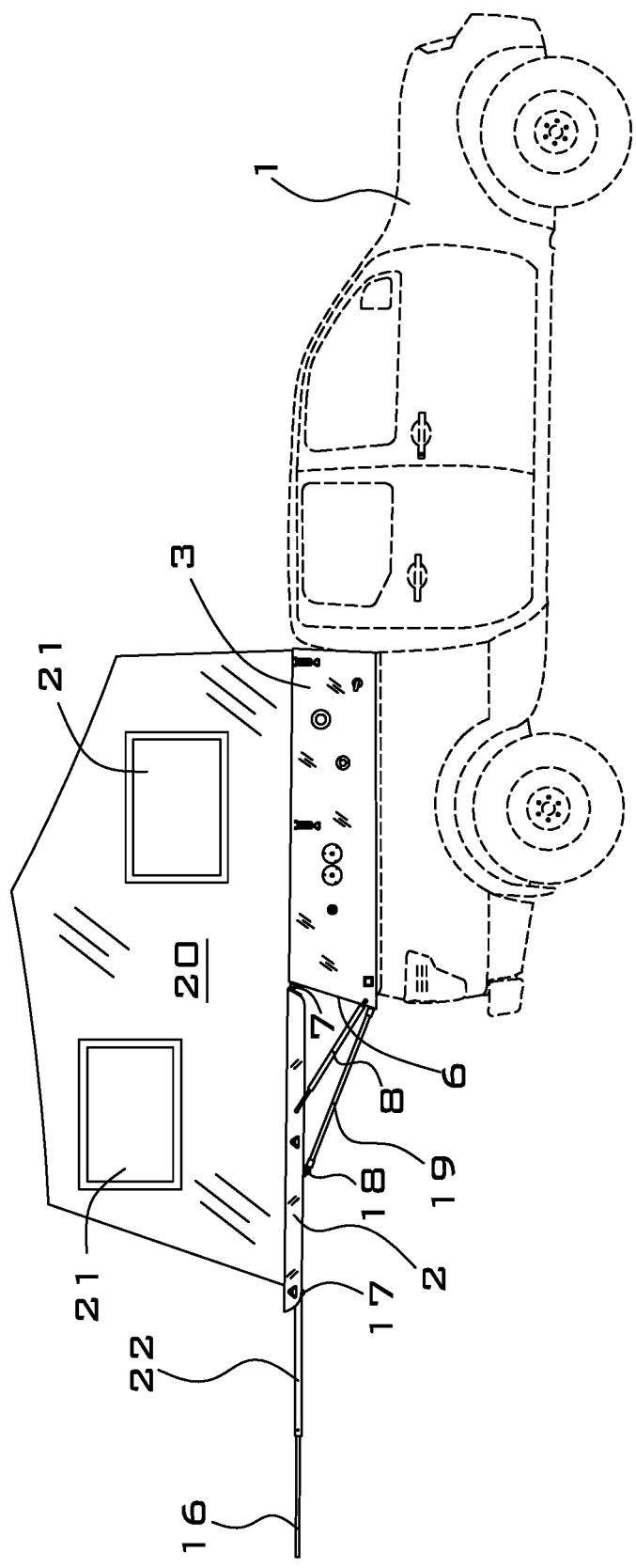
FIG. 2 is an elevation view of the right side of the present invention, shown in the expanded position, and mounted onto a standard-size pickup truck.

FIG. 2 is an elevation view of the right side of the present invention, shown in the expanded position, and mounted onto a standard-size pickup truck 1. As shown, the lid 2 has been rotated approximately 180 degrees about the lid hinges 7, and is supported by the pneumatic gas spring 8 in combination with a right strut 19, whose ball-shaped upper end is removably and rotatably attached to the right strut upper receiver 18 and whose lower end is attached to a right strut lower receiver (shown on FIG. 11) on the rear side panel 6. A foldable tent 20 is positioned over the right side panel 3. the left side panel shown in FIG. 3, and the opened lid 2. The right side of the tent 20 comprises two screened windows 21 with zippered storm flaps, which are positioned as shown. The tent 20 is supported by an internal frame system that is described in reference to FIG. 7. As shown in FIG. 2, the solar panel 16 has been repositioned by rotating it about the solar panel hinges 17 so that it faces upward when the lid is open. An extendable solar panel support member 22 is removably pinned to each side of the solar panel 16 to provide structural support to the solar panel 16.

FIG. 3 is an elevation view of the left side of the present invention, shown in the expanded position, and mounted onto a standard-size pickup truck 1. The left side of the tent 20 comprises a zippered door flap 23, a covered access port 24, and a screened window 21 with zippered storm flap. The left side panel 25 comprises a hinged human access door 26 for ingress and egress to and from the interior of the present invention when it is in the expanded position. The human access door 26 is attached to the left side panel 25 with two human access door hinges 27 positioned along the lower edge of the human access door 26. The two human access door hinges 27 are constructed so that they are able to come apart when the human access door 26 is open, thereby enabling the human access door 26 to be optionally removed from the left side panel 25. The human access door 26 comprises two key locks 28 that enable it to be locked when closed. A handhold 29 is mounted on the left side panel 25 on each side of the human access door 26. The left side panel 25 further comprises a hinged propane tank access door 30, which covers a propane tank storage compartment. The two cam latches 5 located along the upper edge of the left side panel 25 are used to secure the lid to the left side panel 25 when the present invention is in the compacted position. There are two jack attachment fittings 15 located near the bottom edge of the left side panel 25. The opened lid 2 is supported by a pneumatic gas spring 8 in combination with a left strut 31, as well as a lid hinge 7. The pneumatic gas spring 8 has one end rotatably mounted to the lower rear corner of the left side panel 25 and the other end rotatably mounted to the left edge of the lid 2. The left strut 31 is a part of a combination device that is used as a tent erector tool as well as a support strut, as described in reference to FIGS. 4 through 6.

Figure 4:
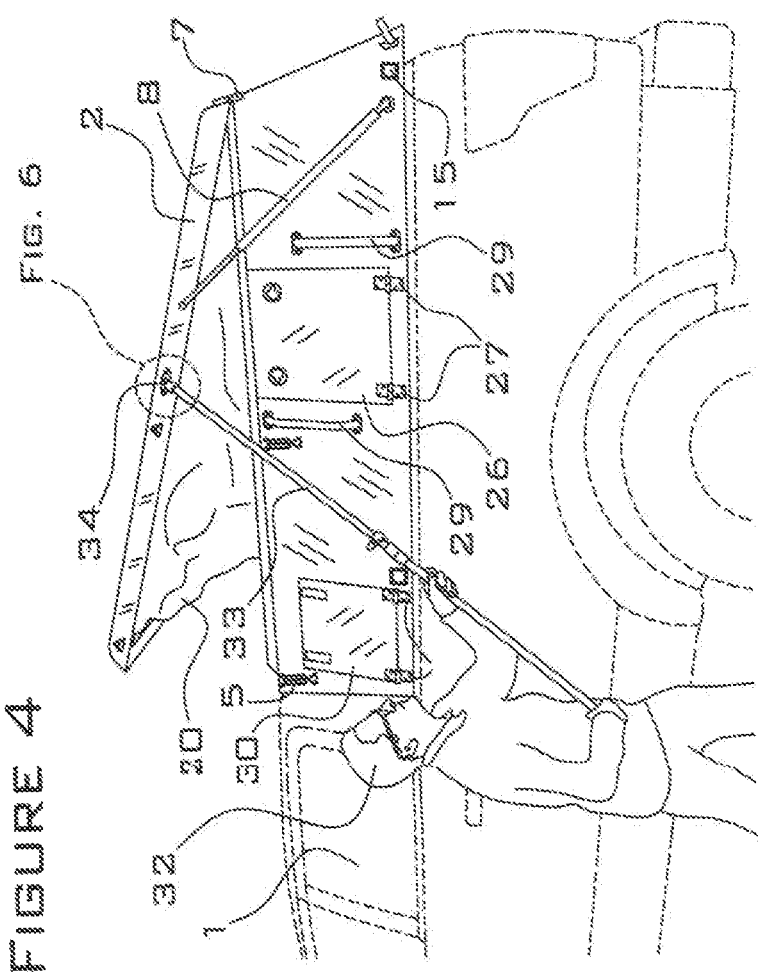
FIG. 4 is an elevation view of the left side of the present invention mounted onto a pickup truck showing a person in the process of raising the tent from the compacted to the expanded position.

FIG. 4 is a right side elevation view of the present invention mounted onto a pickup truck 1 showing a person 32 in the process of raising the tent 20 from the compacted to the expanded position, with the tent 20 shown partially expanded. The tent 20 is expanded by pushing on the tent erector tool 33, which causes the lid 2 to rotate about the lid hinges 7. The upper end of the tent erector tool 33 is removably and rotatably inserted into a left strut upper receiver 34 mounted on the left side of the lid 2. The weight of the lid 2 is partially offset by the lifting force produced by the pneumatic gas spring 8, thereby reducing the pushing force required on the tent erector tool 33.

Figure 5:
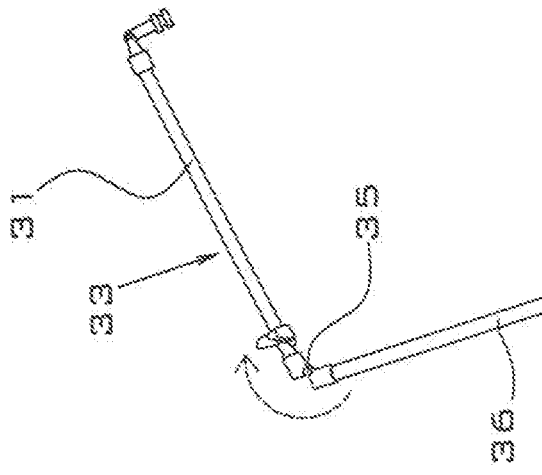
FIG. 5 is a side view of the tent erector tool shown in a partially extended position.

FIG. 5 is a side view of the tent erector tool 33 shown in a partially extended position, with an upper section rotatably connected to a lower section via a hinge 35. The upper section of the tent erector tool 33 is the left strut 31 shown in FIG. 3, and the lower section is an extension handle 36.

Figure 6:
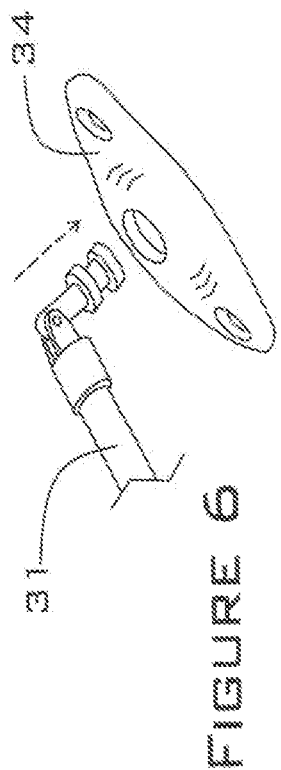
FIG. 6 is a perspective view of the upper end of the left strut being inserted into the left strut upper receiver.

FIG. 6 is a perspective view of the upper end of the left strut 31 being inserted into the left strut upper receiver 34. As shown, the upper end of the left strut 31 terminates in a disc-shaped appendage, which can be rotatably and removably inserted into a mating cavity in the left strut upper receiver 34. When the hinge 35 of the tent erector tool 33 is rotated so that the left strut 31 and the extension handle 36 form a linear pole, the tent erector tool 33 can be used as an extension lifting tool to raise the tent 20 from the compacted to the expanded position, as shown in FIG. 4. When the hinge 35 of the tent erector tool 33 is adjusted so that the left strut 31 and the extension handle 36 are positioned side-by-side, the left strut 31 can be installed as a support between the left side panel 25 and the lid 2, as shown in FIG. 3.

Figure 7:
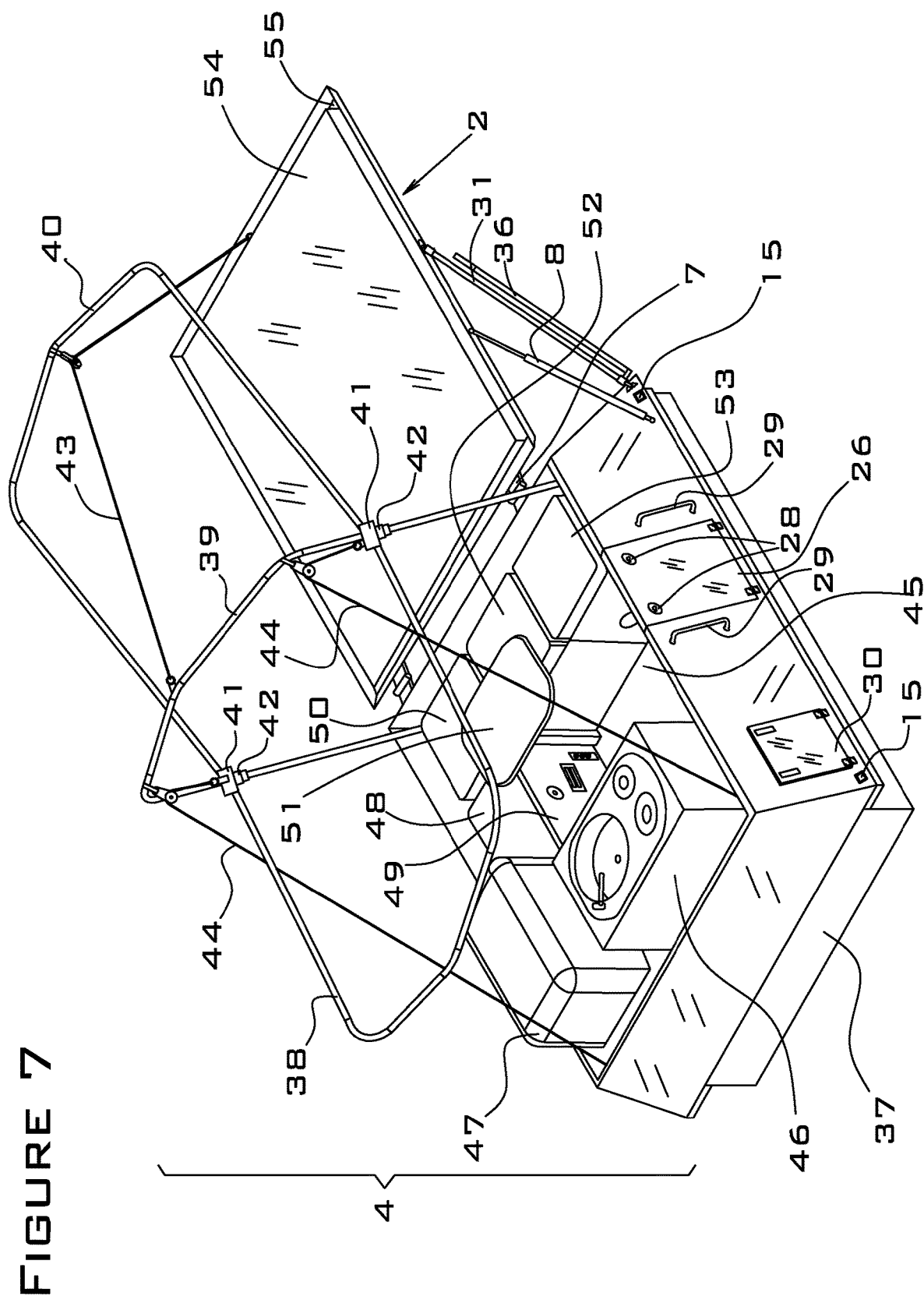
FIG. 7 is a first perspective view of the present invention shown in the expanded position, showing portions of the upper unit and the lower unit, with the tent and solar panel removed for clarity.

FIG. 7 is a first perspective view of the present invention shown in the expanded position, showing portions of the upper unit 4 and the lower unit 37, with the tent and solar panel removed for clarity. The tent is supported by a collapsible frame, which is comprised of three U-shaped sections, including a front frame section 38, a center frame section 39 and a rear frame section 40. The two bottom ends of the center frame section 39 are connected to the left and right rear corners of the floorspace with rotatable bottom connectors. One of these rotatable bottom connectors is shown in FIG. 7. Two frame side connectors 41 connect the ends of the front frame section 38 and the rear frame section 40 to the two sides of the center frame section 39 as shown. The frame side connectors 41 allow the front and rear frame sections 38, 40 to independently rotate about the center frame section 39, and they also allow the front and rear frame sections 38, 40 to slide up and down along the center frame section 39. The frame side connectors 41 each incorporates a slide stop 42 to enable the front and rear frame sections 38, 40 to be locked into position on the center frame section 39 when they are raised into their fully upright positions, thereby forming a rigid frame support for the tent fabric. A rear cable-and-pully assembly 43 has one end attached to the top middle of the center frame section 39 and the other end attached to the rear end of the lid 2. When the lid 2 is being opened, the rear cable-and-pully assembly 43 pulls the three frame pieces 38, 39 and 40 into their upright positions. A pair of forward cable-and-pully assemblies 44 each has one end attached to a side frame connector 41 and the other end attached to a front inside corner of the interior floorspace. These forward cable-and-pully assemblies 44 prevent the frame sections 38, 39 and 40 from over-rotating when they are pulled into their fully upright positions.

When the present invention is in the compacted position, as shown in FIG. 1, the three frame sections 38, 39 and 40 fold together so as to fit within the interior of the upper unit 4 with no disassembly of the frame sections 38, 39 and 40 required. The floor 45 is positioned at a height just above the height of the side rails of the pickup truck. A commercially available kitchen unit 46 comprising a sink, faucet and two stovetop burners is positioned in the front left corner of the floorspace on top of a cabinet (not shown). Hoses (not shown) that are connected to the bottom side of the kitchen unit 46 supply propane, cold water, and hot water into the kitchen unit 46, and a sink drain hose (not shown) provides an outlet for sink water to flow to the sink drain outlet 9 on the right side panel shown in FIG. 1. Each of these hoses is fitted with a quick-disconnect fitting to allow the kitchen unit 46 to be easily removed from the cabinet top for stowage. An example of a typical quick-disconnect fitting is shown in FIG. 15. The quick-disconnect fittings are located in the cabinet beneath the kitchen unit 46. A portable refrigerator 47 is positioned in the front right corner of the interior floorspace, also on top of a cabinet (not shown). The kitchen unit 46 and the refrigerator 47 are removably mounted on cabinet tops when they are in use and are repositioned on the floor of the interior space when they are being stowed, as when present invention is in the compacted position.

A commercially available, propane-powered combination furnace/hot water heater (not shown) occupies the space in the front right corner cabinet below the refrigerator 47. An equipment cabinet 48 on the right side of the floorspace holds a lithium battery and an inverter and has a padded seat top. An electrical control panel 49 is mounted on the front of the equipment cabinet 48 and is shown in detail in FIG. 13. A first storage cabinet 50 with a hinged seat top is located in the right rear corner of the floorspace adjacent to the equipment cabinet 48. A rotatable and removable table 51 is mounted in front of the corner between the equipment cabinet 48 and the first storage cabinet 50. A second storage cabinet 52 with a hinged seat top is positioned in the rear center of the floorspace, and a toilet cabinet 53 with a hinged seat top is positioned in the left rear corner. The toilet within the toilet cabinet 53 is a commercially available, marine-type flush toilet. When the toilet is flushed, the contents of the toilet bowl are transferred to a blackwater tank in the lower unit 37, which is described in reference to FIG. 10. The lid 2 forms a bed platform when open. The bed is supported on the left side by a lid hinge 7, a pneumatic gas spring 8 and the left strut 31. The bed is supported on the right side by a lid hinge 7, a pneumatic gas spring 8, and the right strut 19, as shown in FIG. 2. The lid 2 is fitted with a custom mattress pad 54. The lid 2 comprises a rainwater catchment trough 55 that extends around the perimeter of the lid 2. The rainwater catchment trough 55 captures rainwater that falls down around the outside of the tent and enables the rainwater to be stored in a freshwater holding tank. This novel rainwater catchment feature is not disclosed in any examples of the prior art. Details of the rain catchment system are described in reference to FIGS. 8 and 9.

FIG. 8 is a second perspective view of the present invention shown in the expanded position, showing the right side panel 3, the front panel 56 and a portion of the interior, with the tent, the cable-and-pully assemblies, solar panel and the mattress pad removed for clarity. A rainwater drain connector 57 in the front right corner of the rain catchment trough 55 is shown. A removable hose (not shown) may be used to transport rainwater from the rainwater drain connector 57 to one of the two tank water inlet connectors 12, 13 located of the right side panel 3. The rotatable bottom connector 58 connected to the left bottom end of the center frame section 39 is shown attached to the inside of the left rear corner of the left interior wall 59.

FIG. 9 is a detail view of a portion of the water-catchment system. A fabric tab 60 comprising a loop at one end is sewn to the tent fabric parallel to the bottom of the tent around the inside perimeter of the tent 20. The loop of the tab 60 is inserted within a circular channel 61 in which a segment of the circle has been cut out. A rigid rod 62 is passed through the loop, thereby preventing the loop from pulling out of the circular channel 61. The bottom edge of the tent 20 extends into the rain catchment trough 55. Rainwater that strikes the outer surface of the tent fabric travels down the fabric until it falls into the rainwater catchment trough 55. The bottom edge of the tent 20 is constrained within the rainwater catchment trough 55, thereby preventing the tent bottom from blowing into the bed area, even in a strong wind.

FIG. 10 is a perspective view of the lower unit 37 showing the underside, with the bottom plate and hoses removed for clarity. Three water tanks mounted within the lower unit 37 include a first freshwater tank 63, a second freshwater tank 64, and a blackwater tank 65. In a preferred setup configuration, the first freshwater tank 63 is used to store rainwater, the second freshwater tank 64 is used to store potable water, and the blackwater tank 65 is used to store toilet refuse. The three tanks 63, 54 and 65 are supported on their bottom edges with aluminum angles 66 and covered on their lower sides with a bottom plate (shown in FIG. 11), which extends across the entire bottom area. The blackwater tank outlet is equipped with a macerator pump 67, which facilitates dumping of the blackwater tank. The lower unit 37 comprises a rear door 68 that provides access to drain hoses for the three tanks 63, 64 and 65. The lower unit 37 is designed as a self-contained modular system that may be removably attached to the underside of the upper unit 3. Hoses and wires that connect the upper unit 3 and the lower unit 37 are fitted with quick-disconnect fittings so that the two units may be quickly and easily detached.

FIG. 11 is a rear view of the present invention mounted onto a pickup truck 1, shown with the truck tailgate 69 in the open position. As shown, the bottom plate 70 of the lower unit 37 terminates approximately one foot above the bottom of the truck bed 71, thereby providing significant storage space in the bed below the lower unit 37 for cargo such as a commercial gun safe 72. The solar panel 16 is attached to the inverted top of the lid 2 and supported by two solar panel support members 22. A shower port 74 provides access to a hot and cold water shower spigot (not shown). A person 32 is shown on a stowable ladder 75 in the process of entering the interior of the upper unit 4. The lower end of the right strut 19 is attached to a right strut lower receiver 76 that is mounted on the lower right edge of the rear face 6. The left strut 31 is attached to the left strut lower receiver 77, which is mounted on the lower left edge of the left panel 25 and shown in detail in FIG. 12.

FIG. 12 is a detail perspective view of a portion of the left strut 31, the extension handle 36, and left strut lower receiver 77, which is mounted on the bottom rear corner of the left side panel 25, as shown in FIG. 11. As shown in FIG. 12, the lower end of the left strut 31 is fitted with a left strut lower connector 78 that comprises two holes, which accept a pin 79 that passes through the left strut lower connector 78 and through a hole in the left strut lower receiver 77, thereby rotatably and removably attaching the left strut 31 to the left side panel 25. The left strut lower connector 78 attaches around the shaft of the left strut 31 with a friction fitting, which may be loosened or tightened, thereby providing a length adjustment to the left strut 31.

FIG. 13 is a cross-section detail view of the components that attach the present invention to a pickup truck. Components for the left side attachment are shown, and there are similar components for the right side attachment. The vertical leg of an aluminum angle 80 is attached to the left side of the lower unit 37 with a plurality of riveted nut and bolt assemblies 81 (one shown). The horizontal leg of the aluminum channel 80 is attached to the bottom of the left side panel 25 with a plurality of stake pocket bolts 82 (one shown) that pass through holes in the left side panel 25 and screw into stake pockets 83 that are installed into the top of the pickup truck bed sidewall 84. With this assembly technique, the weight of the upper unit 4 and the lower unit 37 are distributed along the truck bed sidewalls 83.

The handle 85 of a rachet strap is mounted to the floor 45 of the interior space of the upper unit. The strap 86 of the rachet strap passes through holes in the left side frame 25 and the aluminum channel 80, and the end of the strap 86 is connected to a factory-installed D-ring 87 within the truck bed. When the rachet is tightened, it supplies extra hold-down force to the present invention against the truck sidewalls, which reduces the load on the stake pocket bolts 82 in the event of wind loads, bumpy roads, or similar adverse conditions. The present invention may be removed from the truck by unbolting the stake pocket bolts 82 and unhooking the rachet strap 86, attaching three commercially available lift jacks (not shown) to the three jack attachment fittings 15 shown in FIGS. 1 and 3, lifting the present invention off of the truck bed sidewalls 84 with the three lift jacks, and driving the truck forward away from the present invention.

FIG. 14 is an elevation view of the control panel 49. Outlets, controls and status monitors mounted on the control panel 49 include a phone charger 88, a lithium battery charge manager 89, a light 90, a voltage inverter 91, a 115 VAC electrical outlet 92, a furnace hot air outlet 93, a thermostat 94 for the furnace and hot water heater and switch ba 95 of electrical switches. The switch bank contains on/off switches for a water pump, lights, a water tank heater and a macerator pump. The appliances operate on 12 VDC power, and this power may be optionally obtained from the truck battery or from the lithium battery. The lithium battery may be optionally charged from the solar panel 16 shown on FIG. 1 or from an external 115 VAC power source.

FIG. 15 is an elevation view of a typical quick-disconnect fitting of the type utilized in the present invention, with the quick-disconnect fitting shown in the disconnected position. This type of fitting is commercially available and is commonly described as a "cam-and-groove" hose coupling. The quick-disconnect fitting 96 is comprised of a male portion 97 and a female portion 98. A first hose 99 is connected to the male portion 97 and held in place with a first hose clamp 100. A second hose 101 is connected to the female portion 98 and held in place with a second hose clamp 102. The female portion 98 comprises an annular groove 103. The male portion comprises two cam arms 104 that are connected to internal protrusions (not shown). When the female portion 98 is inserted into the male portion 97 and the cam arms 104 are rotated inward (toward the hose), the internal protrusions of the male portion 97 grip the annular groove 103 of the female portion 98 and lock the male and female portions 97, 98 together. Rotating the cam arms 104 outward allows the female portion 98 to unlock and separate from the male portion 97.

Figure 16:
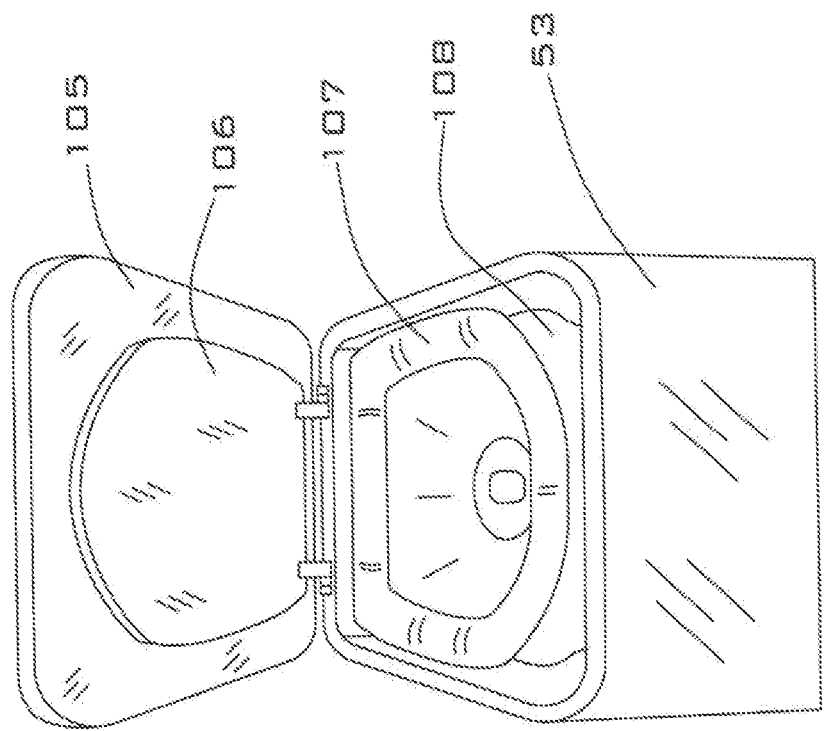
FIG. 16 is a perspective view of the toilet cabinet shown with the hinged seat top in the open position.

FIG. 16 is a perspective view of the toilet cabinet 53 shown with the hinged seat top 105 in the open position. A toilet located within the toilet cabinet 53 comprises a hinged toilet lid 106 shown in the open position, a toilet seat 107 shown in the lowered position, and a toilet bowl 108.

Referring to FIGS. 1 through 14, in a preferred embodiment, the left side panel, the right side panel, the front panel, the rear panel, the rain catchment trough, the doors and ports are comprised of aluminum plate. The struts, hinges, connectors, nuts, bolts, pulleys and latches are manufactured from stainless steel. The tent is manufactured from conventional tent fabric such as canvas or polymer fiber. The interior cabinets and control panel are manufactured from wood. The cables are manufactured from polymer paracord. The tanks are manufactured from high density polyethylene or similar polymer.

The descriptions of the present invention in reference to FIGS. 1 through 14 refer to a preferred embodiment and of the invention; however, the invention may be constructed or deployed with any of the following variations:

The lower unit may be disconnected and removed from the upper unit, and the upper unit may be used as a stand-alone "dry" camper without running water. This option provides more space in the truck bed for materials and supplies.

The present invention may be installed on a tow-behind trailer rather than on a pickup truck.

The present invention may be constructed with scaled-down dimensions in order to fit onto pickup trucks that have bed lengths less than 6-½ feet.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A truck bed camper configured to be mounted on top of a pickup truck with a truck bed having side rails, the truck bed camper comprising:
   (a) an upper unit, wherein no part of the upper unit extends over a cab of the pickup truck when the camper is in an open or a closed position;
   (a) a rigid aluminum lid that is attached to a right side panel and a left side panel of the upper unit with one or more latches and rotatably attached to a rear side panel of the upper unit with at least one hinge, the lid forming a bed platform when in an open position;
   (c) a pneumatic gas spring with a first end and a second end, the first end being rotatably attached to one of the right side panel or the left side panel of the upper unit, and the second end being rotatably mounted to the lid;
   (d) a solar panel that is rotatably mounted to an upper surface of the lid;
   (e) a foldable tent supported by a collapsible frame, the foldable tent being positioned over the right side panel, the left side panel, and the lid when the lid is in an open position;
   (f) a tent erector tool having an upper end that is removably and rotatably inserted into a strut upper receiver mounted on a side of the lid;
   (g) wherein the side rails of the truck bed have a height, a floor that is positioned at a height above the height of the side rails of the pickup truck; and
   (h) a lower unit that is configured to contain one or more freshwater tanks and a blackwater tank.

2. The truck bed camper of claim 1, wherein at least one of the right side panel or the left side panel comprises a hinged human access door.

3. The truck bed camper of claim 1, further comprising a jack attachment fitting on a lower rear edge of one or the right side panel or the left side panel of the upper unit.

4. The truck bed camper of claim 1, further comprising a sink drain outlet, a furnace exhaust vent, a 115-volt alternating current inlet plug, a first freshwater tank inlet connector, a second freshwater tank inlet connector, and a blackwater tank vent on one of the right side panel or the left side panel of the upper unit.

5. The truck bed camper of claim 1, wherein the strut upper receiver is mounted to one of a right edge or a left edge of the lid and a strut with a ball-shaped upper end that is removably and rotatably attached to the strut upper receiver and a lower end that is attached to a strut lower receiver on the rear side panel of the upper unit.

6. The truck bed camper of claim 1, further comprising a first extendable solar panel support member that is removably attached to a first side of the solar panel and a second extendable solar panel support member that is removably attached to a second side of the solar panel and configured to support the solar panel when it is in an extended position.

7. The truck bed camper of claim 2, wherein the human access door is removably attached to the at least one of the right side panel or the left side panel.

8. The truck bed camper of claim 1, wherein at least one of the right side panel or the left side panel comprises a hinged propane tank access door that is configured to cover a propane tank storage compartment.

9. The truck bed camper of claim 1, wherein the tent erector tool comprises an upper section that is rotatably connected to a lower section via a hinge, the upper section of the tent erector tool being a strut, and the lower section of the tent erector tool being an extension handle.

10. The truck bed camper of claim 1, wherein the collapsible frame of the foldable tent is comprised of a U-shaped front frame section with two ends, a U-shaped center frame section with two and two bottom ends, and a U-shaped rear frame section with two ends;
    wherein the two bottom ends of the center frame section are connected to left and right rear corners of an interior floorspace with rotatable bottom connectors;
    wherein two frame side connectors connect the ends of the front frame section and the rear frame section to the two sides of the center frame section; and
    wherein the two frame side connectors are configured to allow the front and rear side frame sections to rotate independently about the center frame section and to slide up and down along the center frame section.

11. The truck bed camper of claim 10, wherein the frame side connectors each incorporates a slide stop that is configured to enable the front and rear frame sections to be locked into position on the center frame section.

12. The truck bed camper of claim 11, further comprising a rear cable-and-pully assembly having one end attached to a top middle of the center frame section and a second end attached to a rear end of the lid; and
    a pair of forward cable-and-pully assemblies, each forward cable-and-pully assembly having a first end attached to a side frame connector and a second end attached to a front inside corner of the interior floorspace.

13. The truck bed camper of claim 1, wherein the upper unit is configured to contain:
    (a) a removably mounted kitchen unit comprising a sink, faucet and stovetop;
    (b) a removably mounted portable refrigerator;
    (c) a toilet cabinet containing a toilet;
    (d) a propane-powered combination furnace/hot water heater; and
    (e) one or more storage cabinets, each storage cabinet having a hinged seat top.

14. The truck bed camper of claim 1, wherein the lid comprises a perimeter, and wherein the perimeter of the lid comprises a rainwater catchment trough that is configured to permit rainwater to flow into a freshwater holding tank via a rainwater drain connector.

15. The truck bed camper of claim 14, wherein a bottom edge of the collapsible tent extends into and is mechanically constrained within the rain catchment trough.

16. The truck bed camper of claim 1, wherein the lower unit is a self-contained modular unit that is removably attached to an underside of the upper unit.

17. The truck bed camper of claim 1, wherein the lower unit comprises a bottom plate that terminates at least one foot above a bottom of the truck bed.

18. The truck bed camper of claim 1, wherein the rear side panel comprises a shower port.

19. The truck bed camper of claim 1, further comprising a ratchet strap that is mounted to the floor of the upper unit and configured to tighten the upper unit against side walls of the tuck bed.

20. The truck bed camper of claim 1, wherein the pickup truck has a battery, appliances contained within the upper unit are configured to obtain power from the truck battery and from a lithium battery situated within the upper unit, and wherein the lithium battery is configured to be charged by the solar panel.

* * * * *